Patented Jan. 9, 1945

2,366,952

UNITED STATES PATENT OFFICE 2,366,952

PROTEINOUS MATERIAL

Arnold K. Balls, Washington, D. C., Walter S. Hale, Alexandria, Va., and Thomas H. Harris, Washington, D. C., assignors to Claude R. Wickard, as Secretary of Agriculture of the United States of America, and his successors in office No Drawing. Application February 8, 1943, Serial No. 475,170

9 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to proteinous materials, and more particularly to proteinous materials derived from vegetable products.

We have found that a new sulfur containing proteinous material, which is highly toxic to certain bacteria and yeasts and is thus useful as a germicide and as an agent to control the activity of certain microorganisms, can be produced from sulfhydryl compounds isolated from cereal grain.

This new material is obtained by hydrolysis of the sulfhydryl compounds followed by fractional precipitation of the hydrolyzate. The sulfhydryl compounds may be isolated from wheat, rye, oats, barley, corn or any other cereal grain by extraction of comminuted grain materials, such as meal, bran, or flour, with organic fat solvents. Suitable fat solvents are petroleum ether and other low boiling petroleum fractions, ethyl ether, benzene, toluene, chlorinated hydrocarbon solvents and the like. The extraction may be carried out by lixiviation according to the process described in the application for patent, Serial No. 343,564, filed July 2, 1940.

Hydrolysis of the sulfhydryl compounds can be effected by means of a strong mineral acid, such as sulfuric or hydrochloric acid, preferably in the presence of a suitable solvent, such as ethyl ether. From the hydrolyzate, which comprises a number of substances of undetermined constitution, the hydrochloric acid salt of the new sulfur-containing proteinous material can be isolated by fractional precipitation from aqueous ethyl alcohol, and this salt can be obtained in substantially pure crystalline form.

The new proteinous material is precipitated upon addition of ethyl alcohol to a neutralized solution of the hydrochloride in water. The hydrochloride appears to be the salt of a substance related to protamines. It yields amino acids on hydrolysis and is incompletely precipitated by sulfosalicylic and by trichloroacetic acid. Measurements of the rate of diffusion indicate a value of about 10,000, but not exceeding 12,000, for the molecular weight of the hydrochloride while analytical data show that its molecular weight must be at least 6,000. The new proteinous material possesses properties of a compound lying on the borderline between proteins and their degradation products. The sulfur content is among the highest known for proteins. This sulfur apears as cystine and may be reversibly oxidized and reduced.

Production of the hydrochloride of the proteinous material from wheat flour is illustrated by the following example:

Using a percolator, 200 pounds of wheat flour was extracted at room temperature with 30 gallons of petroleum ether (boiling range 30°–60° C.) for eight hours. Practically all of the solvent was removed from the extract by distillation in vacuum and the dark-colored, oily residue was kept at about —1.5° C. for several weeks, after which it was centrifuged under refrigeration to remove the precipitate of sterol crystals which had deposited during the cold storage. The thick, oily substance thus obtained was dissolved in about an equal volume of ethyl ether and the ether solution was treated with about one and one-half its volume of cold 1 N-hydrochloric acid in absolute ethyl alcohol and allowed to stand for one hour at about 0° C. The hydrolyzate that formed was separated in a centrifuge and washed first with absolute alcohol and then with ethyl ether.

The hydrolyzate was then dissolved in 100 ml. of water and the solution was mixed with 300 ml. of absolute ethyl alcohol. A precipitate formed and was removed in a centrifuge. The clear liquid remaining was concentrated on a steam bath and then evaporated to dryness in vacuum. There was obtained 16.8 grams of the crude hydrochloride of the sulfur-containing proteinous material.

The crude hydrochloride in the amount of 15.5 grams was dissolved in 25 ml. of water, 225 ml. of absolute ethyl alcohol was added, and the solution was allowed to stand at 5° C. for four hours. A crystalline precipitate of the hydrochloride was formed weighing 4.10 grams.

Using the same procedure the hydrochloride was recrystallized a second and a third time. The following results were obtained from analysis after each crystallization:

|  | Nitrogen | Chlorine | Sulfur |
|---|---|---|---|
|  | Per cent | Per cent | Per cent |
| Crystallized once | 16.20 | 6.64 | 4.49 |
| Crystallized twice | { 17.25<br>17.50 | 6.56<br>6.57 | 4.46 |
| Crystallized three times | { 17.45<br>17.10 |  |  |

The hydrochloride is very soluble in water and in dilute alcohol. Silver chloride may be precipitated directly by adding silver nitrate to the aqueous solution. The acidity of these aqueous solutions is very high. A solution of 1 mg. per ml. in water was found to be at pH 3.85. Hydrolysis of the hydrochloride in constant boiling hydrochloric acid produced nearly an eightfold increase in amino nitrogen. The amino nitrogen after hydrolysis was about three-fourths of the total nitrogen originally present.

The results of an analysis of the thrice-crystallized material are given in the following table:

| | Percent by weight |
|---|---|
| Chlorine (Pregl) | 6.57 |
| Sulfur (Pregl) | 4.42 |
| Nitrogen (Kjeldahl after Pregl) | 17.35 |
| Amino nitrogen (Van Slyke) | 1.65 |
| Arginine (Thomas, Ingalls & Luck) | 20.4 |
| Cystine (Sullivan & Hess) | 15.7 |
| Tyrosine (Bernhard) | 3.0 |

Having thus described our invention, we claim:

1. A hydrochloric acid salt of a proteinous material derived from sulfhydryl compounds isolated from a cereal grain, said salt being crystallizable and containing approximately 17 percent nitrogen and 4.5 percent sulfur by weight, yielding on hydrolysis at least 50 percent of the nitrogen as amino acids of the group consisting of arginine, cystine and tyrosine, and having a molecular weight not less than 6,000 and not exceeding 12,000.

2. The produce defined in claim 1 further characterized in that the cereal grain is wheat.

3. A crystalline hydrochloride of a proteinous material derived from sulfhydryl compounds isolated from a cereal grain, said hydrochloride containing approximately 17 percent nitrogen and 4.5 percent sulfur by weight, yielding on hydrolysis at least 50 percent of the nitrogen as amino acids of the group consisting of arginine, cystine and tyrosine, and having a molecular weight not less than 6,000 and not exceeding 12,000.

4. The product defined in claim 3 further characterized in that the cereal grain is wheat.

5. The process which comprises hydrolyzing sulfhydryl compounds derived from a cereal grain in hydrochloric acid, thereby obtaining the hydrochloric acid salt of a sulfur-containing proteinous material as a constituent of the hydrolyzate, dissolving the hydrolyzate in water, fractionally precipitating the resulting solution by mixing such solution with absolute ethyl alcohol, evaporating the remaining liquid to dryness, dissolving the resulting material in water and then precipitating said hydrochloric acid salt from aqueous solution by adding absolute ethyl alcohol, whereby said hydrochloric acid salt is obtained in substantially pure crystalline form, containing approximately 17 percent nitrogen and 4.5 percent sulfur by weight, yielding on hydrolysis at least 50 percent of the nitrogen as amino acids of the group consisting of arginine, cystine and tyrosine, and having a molecular weight not less than 6,000 and not exceeding 12,000.

6. The process which comprises hydrolyzing sulfhydryl compounds derived from a cereal grain in hydrochloric acid in the presence of a solvent, thereby obtaining the hydrochloric acid salt of a sulfur-containing proteinous material as a constituent of the hydrolyzate, dissolving the hydrolyzate in water, fractionally precipitating the resulting solution by mixing such solution with absolute ethyl alcohol, evaporating the remaining liquid to dryness, dissolving the resulting material in water and then precipitating said hydrochloric acid salt from aqueous solution by adding absolute ethyl alcohol, whereby said hydrochloric acid salt is obtained in substantially pure crystalline form, containing approximately 17 percent nitrogen and 4.5 percent sulfur by weight, yielding on hydrolysis at least 50 percent of the nitrogen as amino acids of the group consisting of arginine, cystine and tyrosine, and having a molecular weight not less than 6,000 and not exceeding 12,000.

7. The process which comprises hydrolyzing a solution in ethyl ether of sulfhydryl compounds derived from wheat with a solution of 1 N-hydrochloric acid in absolute ethyl alcohol, thereby obtaining the hydrochloric acid salt of a sulfur-containing proteinous material as a constituent of the hydrolyzate, dissolving the hydrolyzate in water, fractionally precipitating the resulting solution by mixing such solution with absolute ethyl alcohol, evaporating the remaining liquid to dryness, dissolving the resulting material in water and then precipitating said hydrochloric acid salt from aqueous solution by adding absolute ethyl alcohol, whereby said hydrochloric acid salt is obtained in substantially pure crystalline form, containing approximately 17 percent nitrogen and 4.5 percent sulfur by weight, yielding on hydrolysis at least 50 percent of the nitrogen as amino acids of the group consisting of arginine, cystine and tyrosine, and having a molecular weight not less than 6,000 and not exceeding 12,000.

8. The process which comprises hydrolyzing sulfhydryl compounds derived from a cereal grain in hydrochloric acid, thereby obtaining the hydrochloric acid salt of a sulfur-containing proteinous material as a constituent of the hydrolyzate, dissolving the hydrolyzate in water, fractionally precipitating the resulting solution by mixing such solution with absolute ethyl alcohol, evaporating the liquid remaining from said fractional precipitation to dryness, dissolving the resulting material in water and then adding absolute ethyl alcohol to the aqueous solution of the material thus obtained, whereby said hydrochloric acid salt is precipitated in substantially pure crystalline form.

9. The process of preparing a crystalline hydrochloride of a proteinous material related to protamines which comprises hydrolyzing sulfhydryl compounds derived from a cereal grain in hydrochloric acid in the presence of a solvent, thereby obtaining the hydrochloric acid salt of a sulfur-containing proteinous material as a constituent of the hydrolyzate, dissolving the hydrolyzate in water, fractionally precipitating the resulting solution by mixing such solution with absolute ethyl alcohol, evaporating the liquid remaining from said fractional precipitation to dryness, dissolving the resulting material in water and then adding absolute ethyl alcohol to the aqueous solution of the material thus obtained, whereby said hydrochloric acid salt is precipitated in substantially pure crystalline form.

ARNOLD K. BALLS.
WALTER S. HALE.
THOMAS H. HARRIS.